United States Patent [19]

Kehr et al.

[11] Patent Number: 5,472,764

[45] Date of Patent: Dec. 5, 1995

[54] SOLID COATING COMPOSITION FOR TEXTILE FLOOR COVERINGS

[75] Inventors: Helmut Kehr, Schermbeck; Adolf Kuehnle, Marl; Heinrich Leppek, Gelsenkirchen-Buer; Matthias Schleinzer, Dorsten, all of Germany

[73] Assignee: Huels Aktiengesellschaft, Marl, Germany

[21] Appl. No.: 71,407

[22] Filed: Jun. 4, 1993

Related U.S. Application Data

[62] Division of Ser. No. 718,647, Jun. 21, 1991, Pat. No. 5,248,719, which is a continuation of Ser. No. 248,952, Sep. 26, 1988, Pat. No. 5,047,462.

[30] Foreign Application Priority Data

Sep. 26, 1987 [DE] Germany ............................ 37 32 532.9

[51] Int. Cl.$^6$ .......................... D05C 17/02; C08L 51/06; C08L 23/12; C08K 3/26

[52] U.S. Cl. ................ 428/96; 428/97; 524/504; 524/522; 524/528; 524/914; 524/915

[58] Field of Search ...................... 524/504, 522, 524/528, 914, 915; 428/96, 97

[56] References Cited

U.S. PATENT DOCUMENTS

| | | | |
|---|---|---|---|
| 3,679,469 | 7/1972 | Moore | 428/97 |
| 4,764,546 | 8/1988 | Mitsuno et al. | 524/504 |

FOREIGN PATENT DOCUMENTS

| | | | |
|---|---|---|---|
| 0149452 | 11/1981 | Japan | 524/504 |
| 0219352 | 12/1984 | Japan . | |

*Primary Examiner*—Peter Szekely
*Attorney, Agent, or Firm*—Oblon, Spivak, McClelland, Maier & Neustadt

[57] ABSTRACT

A solid coating composition based on a polyolefin containing a filler is disclosed. The polyolefin is partly or completely reacted with either an unsaturated organic acid or an unsaturated organic acid anhydride.

12 Claims, No Drawings

SOLID COATING COMPOSITION FOR TEXTILE FLOOR COVERINGS

This is a division of application Ser. No. 07/718,647, filed on Jun. 21, 1991, now U.S. Pat. No. 5,248,719, which is a continuation of application Ser. No. 07/248,952, filed on Sep. 26, 1988, now U.S. Pat. No. 5,047,462.

BACKGROUND OF THE INVENTION

1. Field of the Invention

The present invention relates to coating compositions for textile floor coverings.

2. Discussion of the Background

Heavy coating compositions for carpets based on amorphous poly(alpha-olefins) (APAO) have been known for years in addition to those made of asphalt, PVC, and polyurethane mixtures. A typical formulation is made up of approximately 30% of a thermoplastic binder and 70% of a filler. Examples of binders are atactic polypropylene (APP) of various grades (product of homo- or copolymerization) or specific atactic co- and terpolymers. From the last mentioned group, propylene/1-butene/ethylene terpolymers, propylene/ethylene, 1-butene/ethylene, and 1-butene/propylene copolymers have proved particularly useful.

Isotactic polypropylene (IPP), resin, wax, or paraffin can optionally be added for selective modification of properties. Powdered limestone is used primarily as filler, and also barite in some cases.

The solid coating composition is ordinarily applied as a hot-melt adhesive to the underside of carpet materials treated in various ways, that carry a latex or hot-melt precoat. In this regard, for example, refer to B. H. Korner, "The Use of Atactic Polypropylene Using The Example of Solid Carpet Coating", Kunststoffe 65, pages 467 f., 1975, incorporated by reference herein. Carpet tiles are the preferred field of use for the coating compositions.

With increasing use of carpet tiles in residences, hospitals, banks, etc., the specifications for a good solid coating composition are constantly increased. The deficient stability under Load of the carpet tiles made with atactic polyolefins is frequently criticized. Under high Load, such as under legs of chairs or tables, or when walked on with high heels, permanent impressions are made or damage occurs that impair the lay or the dimensional stability of the tiles. The reasons for this is the plastic deformation of the coating composition under the influence of a load. This phenomenon is called "cold flow".

Cold flow can be reduced by adding IPP or by using higher molecular weight atactic polyolefins. However, the flexibility, and thus the lay, are unfavorably affected by this. Problems can also occur in processing because of the increased melt viscosity of the composition. In addition, solid coating compositions with high proportions of IPP tend to shrink because of the recrystallization process. To achieve a balanced property profile, it is therefore generally attempted in practice to limit the addition of IPP to the amount that is just necessary.

There is therefore a strongly felt need for a solid coating composition that can be processed by the conventional hot-melt technique and also has the property of partial elastic recovery in addition to a low depth of penetration under load, i.e., low cold flow.

SUMMARY OF THE INVENTION

Accordingly, it is an object of this invention to provide a solid coating composition.

It is another object of this invention to provide a solid coating composition which can be processed by the conventional hot-melt technique.

It is another object of this invention to provide a solid coating composition which has The property of partial elastic recovery.

It is another object of this invention to provide a solid coating composition which has a low depth of penetration under load, i.e., low cold flow.

The inventors have now surprisingly discovered a novel solid coating composition which satisfies all of the above objects of this invention, and other objects which will become apparent from the description of the invention given hereinbelow.

The invention provides a solid coating composition comprising a polyolefin-based thermoplastic binder containing a filler. The polyolefin is partly or completely reacted with an unsaturated organic acid or an unsaturated organic acid anhydride.

DETAILED DESCRIPTION OF THE PREFERRED EMBODIMENTS

In a first embodiment (A) of the present invention the IPP fraction of the binder ordinarily used to improve the stability under load is completely or partly replaced by a predominantly crystalline polyolefin that has been functionalized in a suitable way by reaction with organic acids containing double bonds or a corresponding acid anhydride.

In another embodiment (B) of the present invention the proportion of atactic polyolefin in the conventional solid coating compositions is partly or completely replaced by an amorphous polyolefin (of low crystallinity) that is functionalized in the same way.

In embodiment (A) above, 0 to 15 wt. % of non-functionalized IPP is present in the binder in addition to the functionalized, predominantly crystalline polyolefin. In embodiment (B) above, the non-functionalized, atactic polyolefin is present in the binder in a range of from 0 to 95 wt. %.

Examples of polymers that can be used in accordance with embodiment (A) include:

Polypropylenes grafted with acrylic acid, methacrylic acid, or fumaric acid. Belonging to this class of compounds, for example, are the POLYBOND grades sold by BP Chemicals Limited.

Polypropylenes grafted with maleic anhydride. Examples of appropriate polymers are sold by the Himont Co. under the name HERCOPRIME.

Maleic acid, monoalkyl maleates, monoalkyl fumarates, and aconitic acid are also suitable unsaturated acids.

In addition to polypropylene, propylene/ethylene copolymers, propylene/1-butene copolymers, 1butene/ethylene copolymers, or a mixture of polypropylene and the copolymers mentioned can also be used.

In general, the graft polymers of polypropylene are prepared by conventional graft polymerization of the unsaturated acids or anhydrides in the presence of the graft substrate and a radical-former. Peroxides, azo compounds, or high-energy radiation can be used as the latter. Typical synthetic examples are listed in European Patent Application Disclosure 0 188 926, Belgian Patent 692 301, Japanese Patent 27 421/66, or U.S. Pat. No. 3,499,819.

The polymers functionalized in this way are added to the binder in an amount of approximately 1 to 20% by wt., preferably 3 to 12% by wt. (based on the binder). To produce an adequate effect, the acid number of the functionalized polymer should be greater than 10 mg KOH/g, preferably 40 to 60 mg KOH/g (determined for anhydrides after prior ring-opening with water). Processing viscosities acceptable in practice are obtained when the Melt Flow Index measured at 230° C. at a load of 2.1 kilopounds (MFI 230/2) of the graft polymer is greater than 30 g/10 min., preferably 40 g/10 min.

Polymers pursuant to embodiment (B) are prepared by radical grafting of amorphous polyolefins with maleic anhydride or fumaric acid, for example. Particularly suitable amorphous polyolefins are the propylene/butene/ethylene terpolymers of Huels AG available under the trade name VESTOPLAST, corresponding to German Patent 29 30 108, for example. Such graft polymers are synthesized in solution or in the melt in the presence of peroxides. Appropriate examples are described, for example, in German Patent Application Disclosure 15 46 982, East German Patent 20 232, German Patent Exposition 26 32 69, and in the Journal of Applied Polymer Science, Vol. 13, pages 1625 fl. (1969).

The functionalized atactic polyolefin of embodiment (B) is present in the binder in a range of from 2 to 97 percent by weight.

It should be noted that degradation of the base polymer is frequently observed during the radical grafting. This degradation can manifest itself negatively particularly in the presence of tertiary carbon atoms in the polymer chain, since cold flow and thus the depth of penetration after loading is found from experience to increase with decreasing molecular weight. However, the positive effect that can be produced by introducing carboxyl groups far outweighs the negative effect of peroxidic degradation of the polymer.

Amorphous polyolefins that contain polybutadiene can also be used. German Patent Publication 27 08 757 discloses the promoting effect of polybutadiene on the degree of grafting during the grafting reaction. When using this grafting aid, partial crosslinking of the polymer takes place at the same time. If starting polymers containing double bonds are used (for example, propylene/ethylene/1,5-hexadiene terpolymers), it is not necessary to add peroxides since the grafting then takes place purely thermally by way of an ene-reaction (cf. for example, German Patent Application 24 01 149 or U.S. Pat. No. 3,260,708). When grafting in the melt, carrying out the process in an extruder pursuant to U.S. Pat. No. 3,862,265 has advantages. Alternatively, however, a batch process can also be used in a mixing vessel.

A suitable amorphous graft polymer has an acid number of 2 to 40, preferably 3 to 10 mg KOH/g (determined for anhydrides after prior reaction of the anhydride group with water and removal of the fractions not covalently bonded). In the case of grafting with maleic anhydride this corresponds to an maleic anhydride content of 0.26 to 0.9 wt. %.

Any monomer (such as maleic anhydride) not bonded covalently during the grafting reaction in fact has no negative effect on the mechanical properties of the coating composition. However, to avoid odor contamination, it can easily be reacted with long-chained alcohols or amines to form the corresponding half-ester or amide.

The melt viscosity of the amorphous graft polymer at 190° C. is in the range between 300 to 60,000, preferably 1,000 and 20,0000 mPa s. The melt viscosity desired in the binder can be selected by varying the proportion of wax, resin, or IPP. In general, solid coating compositions that are readily processable are obtained with a filler fraction of 70 wt. % when the binder has a melt viscosity at 190° C. of 5,000 to a maximum of 20,000 mPA s.

A binder additive of 3 to 5% isotactic polypropylene with an MFI ! 90/5 of 70 g/10 min. in addition to the amorphous graft polymer has proved to be beneficial particularly when emphasis is placed on maximum load stability of the compositions without impairing the flexibility or processing viscosity to an unallowable extent.

Suitable fillers are powdered limestone, barite, and mica. Preferred in all cases is a powdered Limestone with particle size distribution between 24 and 192 μm (a useful commercial product, for example, is the Jura-White filler, grade G.Gr.Al. of Kalksteinwerk Ulm). The filler content can vary between 50 and 85 wt. % and is preferably 70%. The highest contents of filler are possible when using atactic polyolefins of high molecular weight and with high 1-butene content.

In the case of maleic anhydride-grafted polymers, addition of water to open the ring of the anhydride is not necessary; apparently, the traces of moisture present on the filler surface suffice for this.

The composition containing filler are generally prepared in mixing vessels purged with inert gas by first melting the anactic component (for example, APAO or maleic anhydride-grafted APAO) and then mixing it with the isotactic polymer (for example IPP or functionalized IPP) at a temperature of 200° C. until a homogeneous mixture is formed. After adding viscosity regulators such as wax and resin, the filler is then worked in.

To test the mechanical properties, pressed plates (10×10× 0.2 cm) are prepared from the solid coating composition (melt in a die at 190° C.; pressure time 10 min. at 15020 C.; storage time after production: 48 h at room temperature). The depth of penetration of a round 1 $cm^2$ ram is measured on this plate after 4 hours of loading at 50 kp/$cm^2$ ("4-hour stability test"), and the recovery power (remaining depth of penetration) is measured 10 min. after removing the load. The first measured parameter is a measure of the stability under load, and the second provides an indication of the elastic properties of the composition.

Comparison of conventional formulations with the newly developed formulations shows that replacing IPP by functionalized isotactic polymers or replacing APP or APAO by an amorphous graft polymer in solid coating compositions produces stabilities under load that are at least 40% better, i.e., reduced depths of penetration under load. Based on improved recovery power, the remaining deformation or depth of penetration is distinctly less.

In practice, for example, this means that comparatively smaller amounts of functionalized isotactic polymer can be used to produce the same stabilities under load as those normally achieved only with higher proportions of IPP. In this way, the processing viscosity of the composition can be limited to an acceptable level. Other benefits of the newly developed solid coating compositions are found in reduced shrinkage and improved lay of the carpet tiles coated in this way because of greater flexibility.

Other features of the invention will become apparent in the course of the following description of exemplary embodiments which are given for illustration of the invention and are not intended to be limiting thereof.

APAO 1: An amorphous propylene/1-butene/ethylene terpolymer with a melt viscosity at 190° C. of 8,000 mPa s and a penetration 100/25/5 (by the method of DIN 52 010) of 15 0.1 mm.

APAO 2: An amorphous propylene/1-butene/ethylene terpolymer with a melt viscosity at 190° C. of 50,000 mPa s and a penetration 100/25/5 (by the method of DIN 52 010) of 20 0.1 mm.

APAO 3: An amorphous 1-butene/propylene/ethylene terpolymer with a melt viscosity at 190° C. of 8,000 mPa s and a penetration 100/25/5 (by the method of DIN 52 of 15 0.1 mm.

IPP 1: isotactic polypropylene with MFI 190/5 (by the method of DIN 53 753, Code T) of 70 g/10 min.

Wax 1: Polyethylene wax with a drip point of 120° C. and an average molecular weight of 1,600.

Resin 1: Aliphatic hydrocarbon resin with a softening point (ball and ring) of 100° C. and an average molecular weight of 2,400.

KP-P 1: Polypropylene grafted with 6% acrylic acid with MFI 190/5 of 64 g/10 min.

KP-P 2: Polypropylene grafted with 1% maleic anhydride with an iodine value of 70 ml/g.

In all cases, 0.2 parts of IRGANOX B 225 (Ciba-Geigy), a hindered phenol antioxidant is added as stabilizer.

The powdered limestone used as filler is Jura White G.Gr. Al.

Comparison examples

Preparation and properties of conventional solid coating compositions 95 parts of APAO 1 is mixed with 0.2 parts of stabilizer in an oil-heated tank blanketed with nitrogen and is melted at 200° C.. 5 parts of IPP 1 is worked in with a stirrer The finished binder is treated with powdered limestone in a 30:70 ratio and the mixture is homogenized. The properties of the binder obtained are summarized in Table 1, Composition A.

Compositions B and C of Table 1 are likewise conventional solid coating compositions. They are also used for comparison with the compositions pursuant to the invention described below.

EXAMPLE 1

Preparation and properties of a solid coating composition that has been modified with a polypropylene grafted with acrylic acid.

95 parts of APAO 2 is mixed with 0.2 parts of stabilizer in an oil-heated mixing vessel blanketed with nitrogen and is melted at 200° C.. 5.,parts of KP-P 1 is mixed in with a stirrer and the finished binder is treated with powdered limestone in a 30:70 ratio. The mixture is homogenized. The properties of the solid coating composition are summarized in Table 2, Composition D.

EXAMPLE 2

The procedure is the same as in Example 1, but this time the KP-P 1 is replaced by the same amount of KP-P 2. The properties of this solid coating composition are described in Table 2, Composition E.

EXAMPLE 3

IPP in the conventional solid coating composition C (See Table I) is replaced by the same weight of KP-P 1. The properties of the Composition F thus prepared are summarized in Table 2.

EXAMPLE 4

To prepare an amorphous maleic anhydride-graft polymer (of low crystallinity), 450 g of APAO 1, 11.25 g of maleic anhydride, blanketed with nitrogen, and heated to 180° C. at a heating rate of 2° C./min. With continuous kneading, the composition is left for 30 minutes longer at this temperature and is then processed further directly to the solid coating composition. The graft polymer after reaction with water and purification by precipitating it twice from toluene solution with isopropanol), a melt viscosity at 190° C. of 5,000 mPa s, a softening point (DIN 52 011) of 104° C., and a penetration (DIN 52 010) of 15 0.1 mm.

95 parts of graft polymer, 5 parts of IPP 1, and 0.2 parts of stabilizer are blanketed with nitrogen in a mixing vessel and are melted with stirring at 200° C. To the finished binder is added powdered limestone in a 30:70 ratio and the mixture is homogenized. the properties of the solid coating composition are summarized in Table 3, Composition G.

EXAMPLE 5

450 g APAO 2 is grafted with maleic anhydride under the same conditions as in Example 4. The amorphous grafted polymer obtained has an acid number of 4.2 mg KOH/g, a melt viscosity at 190° C. of 19,000 mPa s, a softening point of ! 07° C., and a penetration of 14 0.1 mm. All of the parameters were determined in the same way as in Example 4.

Following the procedure of Example 4, the solid coating composition H is obtained, whose properties are shown in Table 3.

EXAMPLE 6

In the same way as described under Example 4,450 g of APAO 2 is grafted with 22.5 g of maleic anhydride in the presence of 2.7 g of dicumyl peroxide. The amorphous grafted polymer obtained has an acid number of 8.8 mg KOH/g, a melt viscosity at 190° C., and a penetration of 10 0.1 mm. All parameters were determined in the same way as in Example 4.

Following the method of Example 4, the solid coating composition I is obtained (Table 3).

TABLE 1

Properties And Composition of Conventional Solid Coating Compositions

| Composition | Compn. A | Compn. B | Compn. C |
|---|---|---|---|
| APAO | 28.5 pts. APAO 1 | 28.5 pts. APAO 2 | 11.4 pts. APAO 2 |
| APAO | — | — | 11.4 pts. APAO 3 |
| IPP | 1.5 pts. IPP 1 | 1.5 pts. IPP 1 | 1.2 pts. IPP 1 |
| Wax | — | — | 3 pts. Wax 1 |

TABLE 1-continued

Properties And Composition of Conventional Solid Coating Compositions

| Composition | Compn. A | Compn. B | Compn. C. |
| --- | --- | --- | --- |
| Resin | — | — | 3 pts. Resin 1 |
| Filler | 70 pts. powdered limestone | 70 pts. powdered limestone | 70 pts. powdered limestone |
| Properties of the binder | | | |
| Melt viscosity at 190° C. | 12500 mPa s | 68000 mPa s | 14 000 mPa s |
| Penetration (DIN 52 010) | 17 0.1 mm | 10 0.1 mm | 11 0.1 mm |
| Softening point (DIN 52 011) | 159° C. | 160° C. | 158° C. |
| Properties of the solid coating composition | | | |
| Depth of penetration of a 1 $cm^2$ ram after 4 h loading with 50 kp/$cm^2$ in a 2 mm pressed plate | 1.4 mm | 0.5 mm | 0.71 mm |
| Remaining depth of penetration 10 min. after removing load, recovery to | 1.22 mm | 0.33 mm | 0.60 mm |

TABLE 2

Properties and Composition of Solid Coating Compositions That Were Modified With Crystalline Polyolefins Functionalized by Carboxyl or Acid Anhydride Groups

| Composition | Compn. D | Compn. E | Compn. F. |
| --- | --- | --- | --- |
| APAO | 28.5 pts. APAO 2 | 28.5 pts. APAO 2 | 11.4 pts. APAO 2 |
| APAO | — | — | 11.4 pts. APAO 3 |
| Cryst. graft polymer | 1.5 pts. KIP-P 1 | 1.5 pts. KP-P 2 | 1.2 pts. KP-P 1 |
| Wax | — | — | 3 pts. Wax 1 |
| Resin | — | — | 3 pts. Resin 1 |
| Filler | 70 pts. powdered limestone | 70- pts. powdered limestone | 70 pts. powdered limestone |
| Properties of the binder | | | |
| Melt viscosity at 190° C. | 67000 mPa s | 50000 mPa s | 14000 mPa s |
| Penetration (DIN 52 010) | 10 0.1 mm | 10 0.1 mm | 11 0.1 mm |
| Softening point (DIN 52 011) | 159° C. | 147° C. | 158° C. |
| Properties of the solid coating composition | | | |
| Depth of penetration of a 1 $cm^2$ ram after 4 h loading with 50 kp/$cm^2$ in a 2 mm pressed plate | 0.28 mm | 0.25 mm | 0.22 mm |
| Remaining depth of penetration 10 min. after removing load, recovery to | 0.13 mm | 0.10 mm | 0.11 mm |

TABLE 3

Properties and Composition of Solid Coating Compositions That Were Modified With Amorphous Maleic Anhydride Graft Polymers

| Composition | Compn. D | Compn. E | Compn. F. |
| --- | --- | --- | --- |
| Amorphous Maleic Anhydride graft polymer | 28.5 pts. gr. poly. from Example 4 | 28.5 pts. gr. poly. from example 5 | 28.5 pts. gr. poly. from Example 6 |
| IPP | 1.5 pts. IPP 1 | 1.5 pts. IPP 1 | 1.5 pts. IPP 1 |
| Filler | 70 pts. powdered limestone | 70 pts. powdered limestone | 70 pts. powdered limestone |
| Properties of the binder | | | |
| Melt viscosity at 190° C. | 11000 mPa s | 24000 mPa s | 23000 mPa s |
| Penetration (DIN 52 010) | 17 0.1 mm | 11 0.1 mm | 12 0.1 mm |
| Softening point (DIN 52 011) | 159° C. | 159° C. | 158° C. |
| Properties of the solid coating composition | | | |
| Depth of penetration of a 1 $cm^2$ ram after 4 h loading with 50 kp/$cm^2$ in a | 0.55 mm | 0.34 mm | 0.29 mm |

TABLE 3-continued

Properties and Composition of Solid Coating Compositions That Were Modified With Amorphous Maleic Anhydride Graft Polymers

| Composition | Compn. D | Compn. E | Compn. F. |
|---|---|---|---|
| 2 mm pressed plate Remaining depth of penetration 10 min. after removing load, recovery to | 0.41 mm | 0.15 mm | 0.14 mm |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A textile floor covering, comprising carpet coated on the underside thereof with a composition comprising a filler in association with a polyolefin-based thermoplastic binder, wherein said polyolefin is a polyolefin which is at least partly reacted with an unsaturated organic acid or an unsaturated organic acid anhydride.

2. The covering of claim 1, wherein said polyolefin is completely reacted with an unsaturated organic acid or an unsaturated organic acid anhydride.

3. A textile floor covering, comprising carpet coated on the underside thereof with a composition containing a filler in association with a polyolefin-based thermoplastic binder, wherein said thermoplastic binder comprises, as a major component, 80 to 90 wt. % of an atactic polyolefin or a low crystallinity olefin copolymer, and, as a minor component, 1 to 20 wt. % of a predominately crystalline polyolefin which is at least partly reacted with an unsaturated organic acid or an unsaturated organic acid anhydride.

4. The covering of claim 3, wherein said predominantly crystalline polyolefin is completely reacted with an unsaturated organic acid or an unsaturated organic acid anhydride.

5. The covering of claim 3, wherein said predominantly crystalline polyolefin reacted with an unsaturated organic acid or an unsaturated organic acid anhydride has an acid number greater than 10 mg KOH/g and a melt flow index measured at 230° C. at a load of 2.1 kilopounds greater than 30 g/10 min.

6. The covering of claim 1, wherein said thermoplastic binder comprises an atactic polyolefin or an olefin copolymer at least partly reacted with an unsaturated organic acid or an unsaturated organic acid anhydride.

7. The covering of claim 6, wherein said olefin copolymer is completely reacted with an unsaturated organic acid or an unsaturated organic acid anhydride.

8. The covering of claim 6, wherein said atactic polyolefin or said olefin copolymer is reacted with an unsaturated organic acid or with an unsaturated organic acid anhydride has an acid number of from 3 to 10 mg KOH/g and a melt viscosity at 190° C. of between 300 and 60,000 mPa s.

9. The covering of claim 1, wherein said binder contains at least one member selected from the group consisting of waxes, resins, parafins, and stabilizers.

10. The covering of claim 1, wherein said filler is powdered limestone or powdered barite, and said filler is present in said composition in an proportion of from 50 to 85 wt. %.

11. The covering of claim 1, wherein said covering is a carpet tile.

12. The covering of claim 3, wherein said covering is a carpet tile.

* * * * *